Feb. 23, 1960  W. RUEGGEBERG  2,925,864
METHOD AND APPARATUS FOR EDGE HEATING THERMOPLASTIC DIELECTRICS
Filed Feb. 20, 1958  3 Sheets-Sheet 1

INVENTOR

Werner Rueggeberg

BY [signature]

ATTORNEY

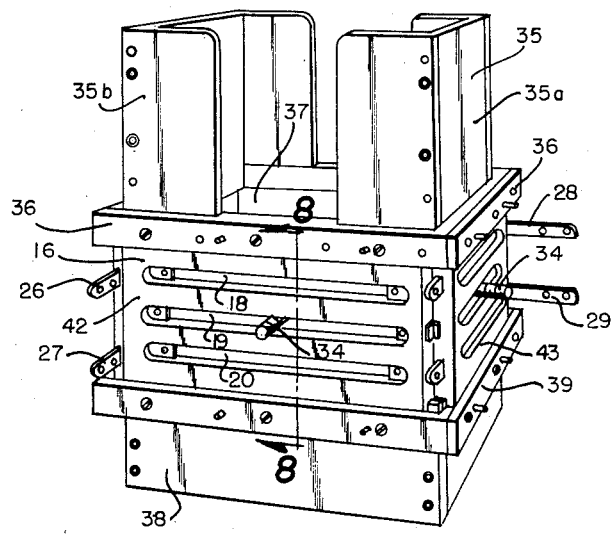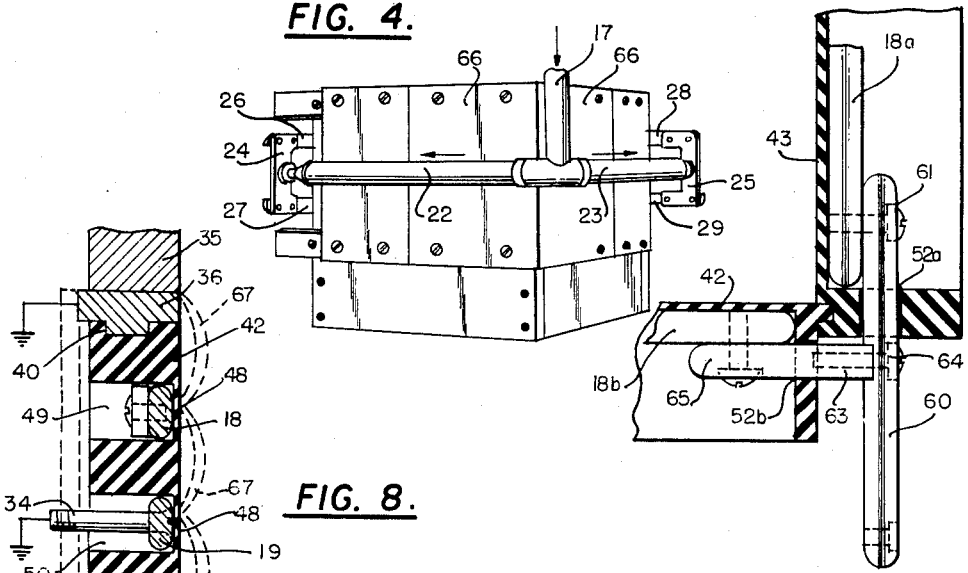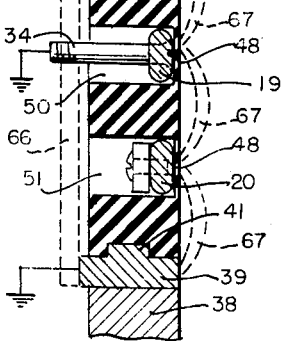

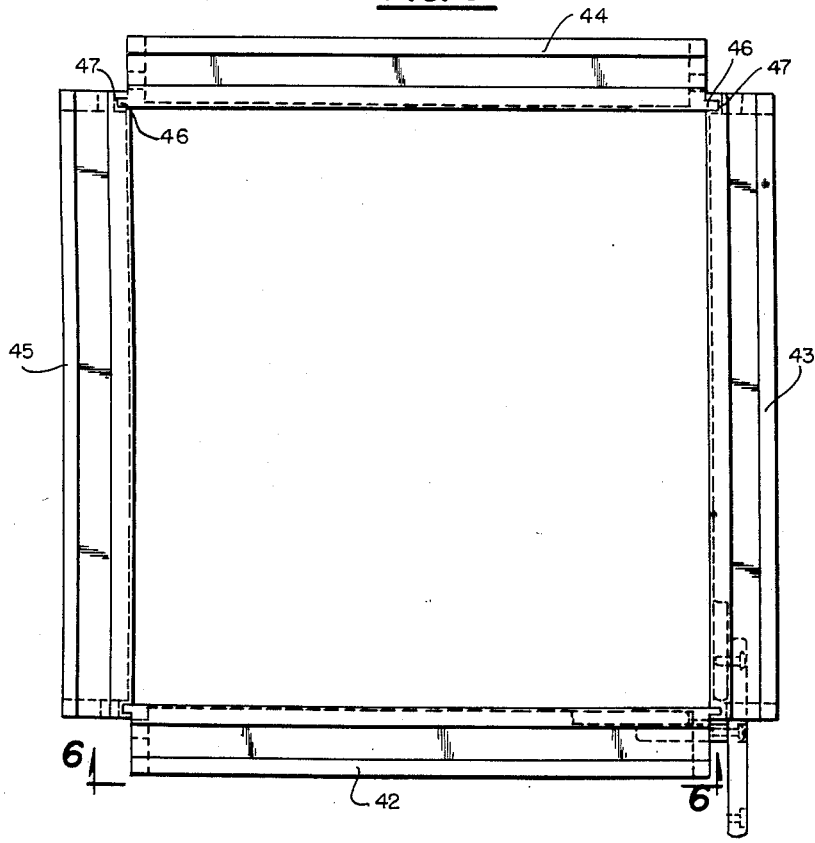
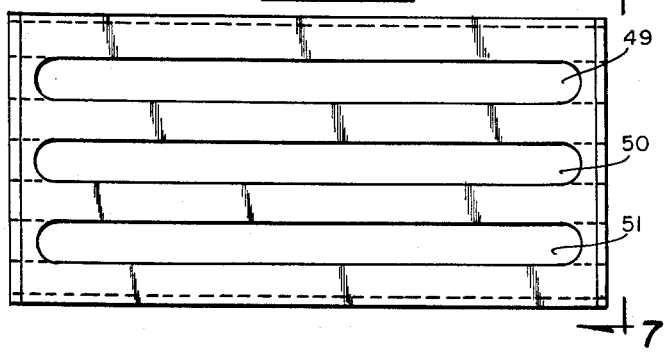
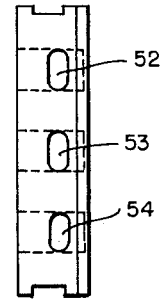

United States Patent Office 2,925,864
Patented Feb. 23, 1960

2,925,864

METHOD AND APPARATUS FOR EDGE HEATING THERMOPLASTIC DIELECTRICS

Werner Rueggeberg, Lancaster, Pa., assignor to Armstrong Cork Company, Lancaster, Pa., a corporation of Pennsylvania Application February 20, 1958, Serial No. 716,303

23 Claims. (Cl. 83—16)

The present invention relates to improved dielectric heater structures, and is more particularly concerned with structures adapted to preferentially heat limited portions of a thermoplastic dielectric workpiece to be cut, thereby to facilitate the cutting operation without otherwise altering the overall dimensions of the workpiece being operated upon.

As is well known, it is often desired to cut or trim various dielectric workpieces in order to secure certain desired final dimensions for said workpieces; and such cutting operations in many cases take the form of die punching processes. In the particular case of rigid sheet materials of dielectric construction, e.g. linoleum tiles, it is quite normal to rough-cut the tiles to approximately desired dimensions whereafter said rough-cut tiles are finally trimmed within fairly precise tolerances to desired final dimensions. In the case of linoleum tiles of the types employed as flooring materials, it is, for example, normally desired to make a final trim to a tolerance of within 0.005 inch.

As a practical matter, it has been found fairly difficult to effect trims of these tolerances when the material being cut is relatively rigid, e.g. as may occur in cold weather; and therefore such trimming operations have had to be confined to periods of warm weather, under which circumstances the material is more pliable than otherwise. While attempts have been made to expand the permissible time period for trimming, through the use of auxiliary heating equipment adapted to heat the tiles or workpieces prior to cutting thereof, such auxiliary heating equipment has, to the present time, been subject to a number of disadvantages.

In particular, it has been found that when the tiles, or other workpieces constructed of thermoplastic dielectric materials, are heated in their entirety to render them more pliable for an edge trimming operation, the dimensional stability of the overall workpiece has been adversely affected, wherefore the tile, by expanding and contracting as a result of said heating and subsequent cooling, assumes a final dimension which is somewhat different from that actually sought during the trimming operation. Attempts have accordingly been made to avoid such generalized heating operations; and it has in fact been suggested that sawing operations rather than more efficient punching or die cutting operations be attempted, in an effort to avoid workpiece distortion due to the generalized heating discussed previously.

By reason of these various difficulties encountered heretofore, the edge trimming of linoleum tiles and other similar thermoplastic dielectric workpieces has been a rather tedious, expensive, and often inaccurate process, and has moreover comprised a substantial bottleneck in the mass production of uniformly dimensioned workpieces. The present invention serves to obviate these difficulties through the use of an improved heater and cutting structure adapted to preferentially heat limited portions of workpieces adjacent the peripheral edges only, thereby to permit such edges to be trimmed accurately and quickly without otherwise affecting the dimensions of the overall workpiece.

It is accordingly an object of the present invention to provide an improved dielectric heater structure adapted to edge heat thermoplastic dielectric materials such as linoleum composition tile or sheet material.

Another object of the present invention resides in the provision of an improved method and apparatus for heating and trimming dielectric workpieces with greater efficiency and accuracy than has been possible heretofore.

Still another object of the present invention resides in the provision of an improved die cutting apparatus including heater means of novel construction whereby thermoplastic materials may be efficiently and accurately cut regardless of external climatic conditions.

Still another object of the present invention resides in the provision of an improved electrode arrangement adapted to edge heat thermoplastic dielectric materials, and adapted to exhibit reduced standing waves and a higher power factor than has been possible in such structures heretofore.

Still a further object of the present invention resides in the provision of an improved hopper adapted to receive a stack of dielectric workpieces for a subsequent manufacturing operation, and adapted to preferentially heat portions of each said workpiece prior to said manufacturing operation.

Another object of the present invention resides in the provision of an improved arrangement for energizing the electrodes of a dielectric heater.

A still further object of the present invention resides in the provision of a method and apparatus for trimming linoleum composition tiles to a closer tolerance than has been possible heretofore.

A still further object of the present invention resides in the provision of an improved dielectric heater comprising a hopper of novel construction.

In accordance with the present invention, the improved heating and cutting arrangement discussed comprises a die cutting apparatus preferably of the punch press type, having a hopper adapted to receive a stack of thermoplastic dielectric workpieces such as linoleum composition tiles, for the edge trimming thereof. The hopper itself is of novel construction and comprises a plurality of Teflon walls supporting a plurality of electrodes which continuously encircle the stacked workpieces in said hopper. The said electrodes, as will be described subsequently, are each energized at a plurality of points thereby to reduce standing waves on said electrodes; and the electrodes are so spaced and dimensioned with respect to one another that the high frequency field produced therebetween is closely confined to the inner walls of said hopper.

The heating field so produced adjacent the inner walls of the hopper is therefore operative to preferentially heat the peripheral edges only of the stacked workpieces in said hopper; and the overall arrangement is associated with a mechanism adapted to sequentially feed the edge heated workpieces out of said hopper and under the aforementioned cutting die before the heated edges of said workpieces cool to any substantial extent, whereby the several workpieces are accurately trimmed without said workpieces being heated throughout.

The foregoing objects, advantages, construction and operation of the present invention will become more readily apparent from the following description and accompanying drawings, in which:

Figure 3 is a perspective view of an improved edge heating hopper, constructed in accordance with the present invention, and having the grounded side plates thereof removed.

Figure 4 is a perspective view of a portion of the hopper shown in Figure 3 with certain side plates and electrical connections in place.

Figure 5 is a top view of portions of the improved hopper constructed in accordance with the present invention.

Figure 6 is a view taken on line 6—6 of Figure 5 showing a typical Teflon insert comprising one side of said hopper.

Figure 7 is an edge view of said Teflon insert taken on line 7—7 of Figure 6.

Figure 8 is a view taken on line 8—8 of Figure 3 showing the hopper construction with electrodes in place; and Figure 9 is a partial view of a hopper corner construction showing the method of interconnecting the several electrodes to one another.

Figure 1:
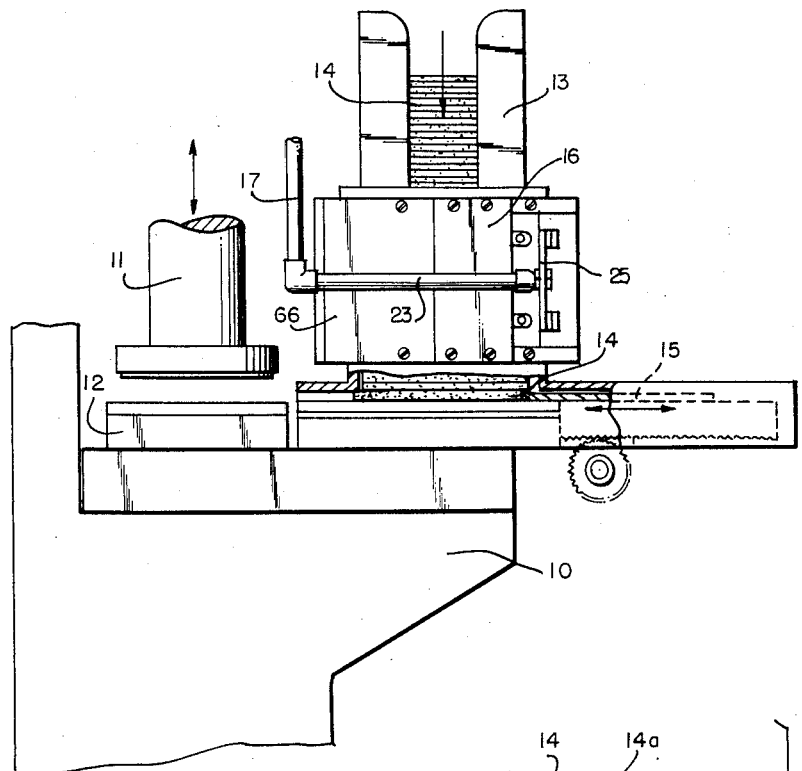
Figure 1 is an illustrative diagram of a heating and trimming apparatus constructed in accordance with the present invention.

Referring now to Figure 1, it will be seen that an improved heating and trimming apparatus constructed in accordance with the present invention comprises a press 10 having a cutting die 11 adapted to reciprocate toward a cutting platen 12. The press 10 further includes a hopper 13 of open topped substantially rectangular configuration adapted to receive a stacked plurality of dielectric workpieces 14 which may, for example, be linoleum composition tiles.

The said workpieces 14 are adapted to be fed in sequence from the bottom of hopper 13 by a feeding plate 15 which is mounted for reciprocatory motion in synchronism with the reciprocal motions of cutting die 11, whereby successive ones of said workpieces 14 are fed from hopper 13 onto cutting platen 12 for edge trimming thereof. The actual arrangement of punch press 10 and its associated components is known in the art and does not per se, comprise the present invention. Reference is made to Metcalf U.S. Patent No. 2,657,050, issued October 27, 1953, for "Device for Feeding Sheet Materials," for a more detailed description of one typical cutting press which may be employed in combination with the remaining portions of the present invention.

As has been discussed previously, the edge trimming of dielectric workpieces or tiles 14 is relatively difficult unless the titles are sufficiently warm to be rendered pliable in nature. Cutting operations of the types contemplated by the present invention have, therefore, been heretofore confined in many instances to the summer months; and other more difficult operations such as sawing techniques have been attempted under colder climatic conditions. In order to utilize the more efficient die cutting operation contemplated by the present invention, regardless of climatic conditions, it is therefore desirable to elevate the temperature of the tile edge portions by between 40° and 60° F. in order to render these limited portions of the tile more pliable for cutting purposes; and this temperature elevation should be confined, if possible, to the periphery of the titles inasmuch as it has been found that more generalized heating of the several workpieces results in a major departure from the desired final dimensions of the tile when the tile as a whole cools subsequent to the trimming operation.

It should further be noted that, inasmuch as the edges only should be heated, and inasmuch further as the edges of the workpieces tend to be the prime points for radiation and spreading of heat both inward and outward of the tile, the punching or trimming operation must be effected with extreme rapidity in order that the desired edge cuts are effected before the workpiece edges cool to any appreciable extent.

The arrangement of Figure 1 includes all of these desirable features. In particular, the hopper 13 includes a heater portion 16 comprising a plurality of electrodes (to be described subsequently) encircling the stacked workpieces 14, and dimensioned and positioned with respect to one another so as to produce a high frequency dielectric heating field which is confined to an extremely limited portion adjacent the peripheral edge of each of the tiles 14. The electrodes are energized, as will be described subsequently, by a transmission line 17 coupled via an appropriate impedance matching network (not shown), to an appropriate source of oscillations (not shown), and connected to the several electrodes comprising heater 16 at a plurality of points, whereby standing wave effects are appreciably reduced. The transmission line 17 (and 23, to be described) is normally provided with conductive radiation shields, not shown, to reduce radiation and to prevent an operator from contacting any structure having high voltages thereon.

The overall arrangement is such that the tiles comprising stack 14 progress through hopper 13 as successive tiles are fed from the bottom of said stack by feeding plate 15; and the edge heated tiles so appearing at the bottom of hopper 13 are, as will become apparent from a consideration of Figure 1, quickly fed under cutting die 11 whereby the pliable heated edges of said workpieces may be cut before any appreciable cooling thereof occurs. As a practical matter, the several tiles comprising stack 14 are fed at a rate of approximately 80 per minute from the bottom of hopper 13; and the several dimensions of the tiles 14, hopper 13, and heater 16, are so chosen that each tile remains in the heating field for a period of approximately 30 seconds during which time the edges of each said tile are elevated in temperature by approximately 40° to 60° F. to a depth of approximately ¼ inch, with any deeper penetration of heating being considered objectionable inasmuch as it is not necessary from the point of view of the cutting operation, and is highly undesirable from the point of view of tile dimensional stability.

The actual physical construction of the hopper 13 and its heater portion 16 will be discussed subsequently, but reference is initially made to Figure 2 in order that the electrical characteristics of the heater may be more readily appreciated. As shown in said Figure 2, the electrode arrangement employed in the heater 16 (Figure 1) comprises a plurality of ring-shaped electrodes 18, 19 and 20 disposed in planes generally parallel to one another and generally parallel to the planes of the individual tiles comprising stack 14. Each of the electrodes 18, 19 and 20 is arranged to completely surround all four sides or edges of each of the tiles in stack 14; and the outermost electrodes 18 and 20 are energized from a source 21 via the aforementioned connection 17, while the intermediate electrode 19 is grounded, thereby to produce stray fields between the several electrodes 18, 19 and 20 which are confined to the edge portions of the stacked tiles 14. The term "stray field" is meant, in the present context, to designate a system wherein only about 11 to 12% of the total electric field associated with the electrode system couples the tile or work load; and the actual portion of the field coupling the stack 14 is confined to an extremely limited portion of the tile edges shown in cross-hatching as 14a, whereby the heating effects penetrate the tiles to a depth of no greater than ¼ inch from the tile edges themselves.

Figure 2:
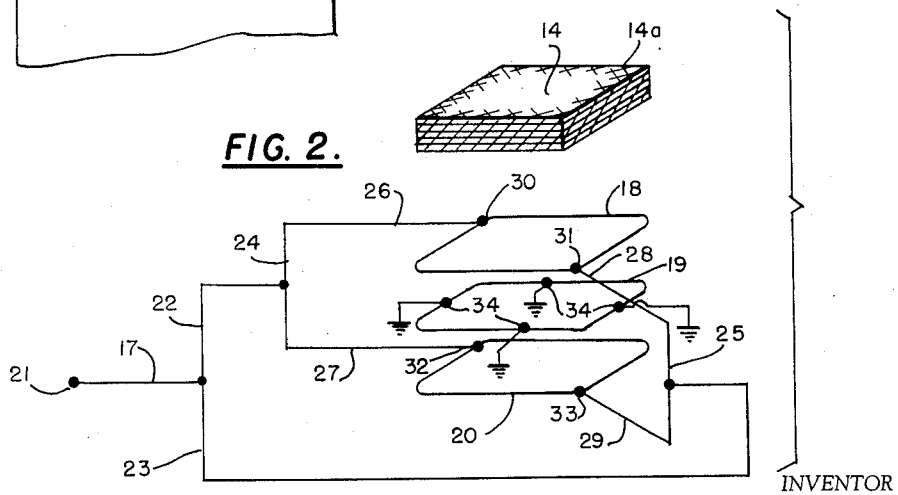
Figure 2 is a schematic diagram showing the electrical configuration of the dielectric heater utilized in the present invention.

Certain characteristics of the system shown in Figure 2 should be noted. In particular, each of the electrodes 18 and 20 is energized at a plurality of points, whereby standing waves on said electrodes are reduced; and the reduction of standing waves is in fact particularly to be desired in a system of the type contemplated by the present invention in order to maintain a uniform temperature elevation of the tile around its entire periphery. In accordance with this concept, therefore, the line 17 feeds a pair of symmetrical auxiliary lines 22 and 23 which are in turn connected by means of symmetrical ties 24 and 25 to symmetrical feeders 26 through 29 inclusive associated with symmetrically located spaced points 30 through 33 of the electrodes 18 and 20. All of the points 30 through 33 are therefore energized in phase with one another, and indeed plural points on each electrode are so energized, thereby assuring that any standing waves appearing on an individual electrode such as 18 cannot exceed an electrical length associated with the physical length of one of its four sides.

In addition, the intermediate electrode 19 is grounded, as illustrated in Figure 2, on all four sides thereof, at points designated 34; and by reason of this multiple grounding of electrode 19, no standing waves of significance can appear on said electrode over any electrode length in excess of one-half side. Voltage variations along the several electrodes 18 through 20 are therefore reduced to a minimum, thereby assuring more uniform heating of the edge portions 14a of the several tiles 14 as the stack of tiles progresses through the electrodes 18 through 20.

The various electrodes are actually arranged in the heating portion 16 of hopper 13 in a manner which will become most readily apparent from a consideration of Figures 3 through 9. The hopper itself (see Figure 3) comprises a stacker 35 taking the form of a pair of spaced U-shaped steel guides 35a and 35b supported in place on a thick brass ring 36 encircling the receptacle 37 which is adapted to receive the stack of tiles or workpieces. A steel base 38 is provided for mounting the overall hopper and its associated heater on the bed of press 10, and said base 38 carries a further thick brass ring 39 which also encircles the receptacle 37 in a manner similar to that described in reference to ring 36.

Each of the rings 36 and 39 includes a projecting key 40 and 41 (see Figure 8) which retain therebetween a plurality of interlocked Teflon supports. These supports, which have been designated 42 through 45 inclusive (see Figure 5) include projecting keys and keyways 46, 47 adjacent their outer edges whereby the several supports 42 through 45, in conjunction with the brass rings 36 and 39, can be physically but removably locked to one another to form a stable hopper structure. The individual Teflon inserts 42 through 45 include a front surface 48 (see Figure 8) which is of smooth unbroken configuration facing the interior of the hopper; and this smooth unbroken surface acts as an arc shield as well as a dust and vapor barrier between the several electrodes 18 through 20 (see Figures 2 and 8) and the workpieces in the hopper. The Teflon inserts further define a plurality of relatively deep elongated slots 49 through 51 (see Figures 6 and 8) adapted to receive individual elongated bars comprising portions of the several electrodes 18 through 20 already described; and the ends of each of the Teflon inserts 42 through 45 define a plurality of elongated rectangular apertures 52 through 54 (see Figure 7) adapted to receive the various electrical connections which serve to tie the individual bars to one another, thereby to form the ring-like electrodes already discussed; and which further serve to provide energization to said electrodes.

The electrodes themselves (see Figure 8) are of elongated flat rectangular cross-section with full rounded edges and are supported within the slots 49 through 51 at positions closely adjacent the front barrier 48 of the Teflon supporting structure. The electrodes 18 through 20 are, in a preferred embodiment of the present invention, spaced from one another by a distance of approximately 1¼ inches; and the wider flat edge of each said electrode 18 through 20 is preferably disposed, as illustrated in Figure 8, in a plane parallel to the edge plane of the stack of tiles. This configuration and spacing of electrodes has been found to give the desired preferential heating effect while simultaneously permitting operation at a power factor of approximately 0.014, which is entirely adequate for the purposes contemplated by the present invention.

The actual arrangement for connecting the several electrode sections is illustrated in Figure 9. In particular, it will be noted that electrode sections designated 18a and 18b which are, for purposes of the subsequent discussion assumed to comprise individual bars forming two sides of the electrode 18, are tied to one another by a first feeder 60 passing through the aperture 52a in Teflon support 43 and bolted at 61 to electrode portion 18a; and a further feeder 63, bolted at one of its ends 64 to feeder 60 and bolted at the other of its ends 65 to electrode portion 18b, passes through the slot 52b in Teflon support 42. All of the corners of the several bars comprising individual electrodes 18 through 20 can be interconnected in a manner similar to that shown in Figure 9, thereby to produce the ring configuration of electrodes already described in reference to Figure 2.

The individual feeders 60, which have been previously identified as feeders 26 through 29 inclusive, extend outwardly, as shown in Figure 3, from the electrode sets comprising electrodes 18 and 20; and these feeder strips 26 through 29 are thereafter tied to one another by plates 24 and 25 (see Figures 2 and 4) thereby to provide the plural-point energization for electrodes 18 and 20 with its resultant decrease of standing waves, already described. The individual bars comprising the central electrode 19 support outstanding bolts which have been designated 34 in Figure 3, inasmuch as these bolts serve to ground the electrode 19 in the manner already described in Figure 4. The bolts 34 themselves are adapted to engage brass cover plates 66 (see Figures 1, 4 and 8) which encase the heating portion of the hopper 13; and said cover plates 66 are bolted into the brass rings 36 and 39 whereby rings 36 and 39, intermediate electrode 19 and cover plates 66, are all maintained at ground potential. The complete operative electrode set therefore comprises not only electrodes 18 through 20, but also comprises the outer brass rings 36 and 39 whereby the heating field approximates the configuration shown in dotted lines as 67 in Figure 8.

It should be noted that inasmuch as the cover plate 66 is grounded, the several deep slots 49 through 51 defined by the Teflon supports 42 et seq., are not filled with any dielectric material other than air, and are open in the direction facing grounded plates 66. This elimination of dielectric filler to the rear of the several electrodes 18 through 20 is most important inasmuch as use of an air dielectric between the several electrodes and the ground plates 66 reduces the shunt capacity between said electrodes and ground, thereby permitting the realization of an increased power factor which is always desirable in a dielectric heating electrode system.

As will be appreciated by the foregoing description therefore, the overall arrangement of the present invention is such that a relatively efficient dielectric heater adapted to effect edge heating of dielectric workpieces is constructed within the confines of the workpiece-supporting hopper itself. The electrodes are so arranged that preferential heating is effected, thereby assuring dimensional stability of the dielectric workpieces; and the overall heating and hopper arrangement is in turn so disposed with respect to the trimming apparatus that the edge heated tiles can be quickly and efficiently cut to closer tolerances, regardless of climatic conditions, than has been possible heretofore.

While I have thus described a preferred embodiment of the present invention, many variations will be suggested to those skilled in the art; and it must therefore be emphasized that the foregoing description is meant to be illustrative only and should not be conisdered limitative of my invention. All such variations and modifications as are in accord with the principles described are meant to fall within the scope of the appended claims.

Having thus described my invention, I claim:

1. In combination, a sheet cutting apparatus having a hopper disposed closely adjacent thereto for supporting a stacked plurality of thermoplastic dielectric workpieces therein, the walls of said hopper comprising a plurality of spaced electrodes energized by high frequency energy thereby to form dielectric heater means producing a high frequency field closely confined to said walls of said hopper for heating a limited edge portion of each of said stacked workpieces in said hopper, and means for sequentially feeding individual ones of said edge heated workpieces out of said hopper into said sheet cutting apparatus whereby said apparatus cuts said individual workpieces adjacent the heated edges thereof before said edges experience any substantial cooling.

2. In combination, a hopper adapted to receive a stack of linoleum composition tiles, the walls of said hopper including a plurality of spaced electrodes energized by high frequency energy for producing a high frequency heating field closely confined to the walls of said hopper adapted to preferentially heat the edges only of said tiles, a die cutting apparatus disposed closely adjacent said hopper, and means for rapidly feeding said edge heated tiles from said hopper to said die cutting apparatus.

3. In combination, a hopper of open-topped substantially rectangular configuration adapted to receive a stack of dielectric workpieces therein, the walls of said hopper comprising a plurality of spaced electrodes adjacent each of the edges of said stacked workpieces, means for energizing said electrodes to produce a high frequency heating field closely confined to the inner walls of said hopper whereby each of said workpieces is preferentially heated at a limited peripheral area of all the edges thereof, means disposed adjacent the bottom of said hopper for sequentially feeding individual successive ones of said workpieces from the bottom of said stack whereby individual ones of said workpieces are caused to move through said edge heating field from the top toward the bottom of said hopper during operation of said feeding means, and cutting means comprising a cutting element having a temperature less than that of said heated tile edges adapted to trim the edges of successive ones of said individual edge heated workpieces as they are fed from the bottom of said stack.

4. In combination, a hopper of substantially rectangular configuration adapted to receive a stack of dielectric workpieces therein, the walls of said hopper comprising a plurality of dielectric supporting plates having a substantially smooth surface adjacent the interior of said hopper and defining a plurality of elongated open slots facing the exterior of said hopper, a plurality of elongated substantially flat electrodes disposed in said slots, means for interconnecting said electrodes to one another adjacent the edges of said supporting plates thereby to effect a plurality of electrode sets respectively encircling said workpieces, means for energizing selected ones of said electrode sets at plural spaced points thereby to reduce standing waves on said energized electrode sets, means for grounding other ones of said electrode sets at plural spaced points thereby to reduce standing waves on said grounded electrode sets, said electrodes being operative to produce a high frequency field closely confined to the inner walls of said hopper adapted to preferentially heat the edges of said stacked workpieces, and means for cutting the preferentially heated edges of said workpieces thereby to alter the dimensions of said workpieces subsequent to the edge heating thereof.

5. The combination of claim 4 wherein said cutting means comprises a punch press having a reciprocating die, and means operative in synchronism with said die reciprocations for feeding said workpieces from said stack to said die before appreciable cooling of said workpiece edges occurs.

6. In combination, an elongated upright substantially rectangular hopper comprising guide means adapted to receive a stack of flat thermoplastic dielectric workpieces, the lower end of said hopper below said guide means including a plurality of spaced electrodes disposed in surrounding relation to said stacked workpieces and energized to produce a high frequency field closely confined to the inner lower walls of said hopper, said high frequency field comprising a stray field coupling the edges only of said tiles for preferentially heating said tile edges, and means disposed adjacent the bottom of said hopper for feeding said workpieces out of said hopper whereby each of said workpieces is moved progressively through said hopper and through said high frequency field thereby to effect preferential edge heating of said workpieces.

7. The combination of claim 6 wherein each of said workpieces is disposed transverse to the direction of elongation of said hopper, said plurality of spaced electrodes comprising elongated electrode bars supported by said hopper in directions generally parallel to the outer edges of said workpieces whereby said stray field couples the edges of said tiles in directions generally transverse to the planes of said tiles.

8. In combination, an open-topped hopper adapted to receive a stack of flat dielectric workpieces therein, the walls of said hopper including a plurality of electrodes each continuously encircling said workpieces adjacent the edges of said workpieces, each of said electrodes being of elongated rectangular cross-section and having its longer flat edge disposed facing the edges of said stacked workpieces, said encircling electrodes being respectively disposed in planes substantialy parallel to the planes of said flat workpieces, and means for energizing each of said electrodes at a plurality of spaced points thereby to reduce standing waves on said electrodes, said electrodes being so spaced from one another that a high frequency field, closely confined to the inner walls of said hopper, is produced between said energized electrodes thereby to preferentially heat said workpieces adjacent all the peripheral edges of said workpieces.

9. The combination of claim 8 including a plurality of grounded conductive plates spaced from said electrodes and encasing said hopper, and means for electrically connecting plural spaced points on selected ones of said electrodes to said grounded plates.

10. The combination of claim 9 wherein said electrodes are spaced from said grounded conductive plates by an air dielectric.

11. A hopper for heating dielectric workpieces comprising a plurality of wall structures interconnected to one another to define a central open receptacle for the reception of said workpieces, each of said wall structures comprising a substantially rectangular dielectric supporting structure having a relatively smooth face adjacent said receptacle and defining a plurality of elongated slots extending generally parallel to one another from said smooth face away from said receptacle, a plurality of substantially flat bar electrodes disposed in said plurality of slots respectively at positions closely adjacent said smooth face, said slots being open to the rear of said bars at positions remote from said electrodes, and means electrically interconnecting the individual bar electrodes in different ones of said wall structures to effect a plurality of electrode rings continuously surrounding said receptacle.

12. The combination of claim 11 including conductive supporting means disposed closely adjacent said dielectric supporting structures, and means for grounding said conductive supporting means.

13. The combination of claim 12 including grounded conductive cover plates attached to said conductive supporting means adjacent the open edges of said slots and spaced from the electrodes in said slots by an air dielectric.

14. The method of accurately trimming thermoplastic dielectric workpieces which comprises stacking said workpieces, producing a high frequency field coupling said stacked workpieces adjacent the peripheral edges thereof only, whereby the peripheral edges of each of said workpieces are preferentially heated to a temperature higher than the remainder of said workpieces but below the fusion temperature of said workpieces, and thereafter die-cutting the heated edges of individual ones of said stacked workpieces with a die having a temperature substantially equal to that of said workpiece remainders.

15. In combination, a sheet cutting apparatus having a hopper disposed closely adjacent thereto for supporting a plurality of thermoplastic dielectric workpieces therein, said hopper including dielectric heater means comprising a plurality of ring-like electrodes disposed in planes generally parallel to one another in surrounding relation to said workpieces and arranged to heat a limited portion of all the peripheral edges of each of said workpieces, and means for sequentially feeding individual ones of said edge heated workpieces out of said hopper into said sheet cutting apparatus whereby said apparatus cuts said individual workpieces adjacent the heated edges thereof before said edges experience any substantial cooling.

16. The combination of claim 15 including means effecting in phase energization of plural spaced points on each of said ring-like electrodes, thereby to reduce standing waves on said electrodes.

17. In combination, a hopper of open-topped substantially rectangular configuration adapted to receive a stack of dielectric workpieces therein, the walls of said hopper comprising a plurality of rectangularly disposed dielectric supporting walls removably interlocked to one another, each of said walls supporting a plurality of electrode bars, means for removably interconnecting said bars to one another thereby to effect a plurality of spaced electrodes respectively encircling said stacked workpieces, means for energizing said electrodes to produce a high frequency heating field closely confined to the inner walls of said hopper whereby said workpieces are preferentially heated at limited peripheral edge areas thereof, and means disposed adjacent the bottom of said hopper for sequentially feeding individual successive ones of said workpieces from the bottom of said stack whereby individual ones of said workpieces are caused to move through said edge heating field from the top toward the bottom of said hopper during operation of said feeding means.

18. The combination of claim 17 including conductive means structurally supporting said dielectric supporting walls, said heating field extending to said conductive means as well as between said electrodes.

19. In combination, a hopper of substantially rectangular configuration adapted to receive a stack of dielectric workpieces therein, the walls of said hopper comprising a plurality of dielectric supporting plates, a plurality of elongated substantially flat electrodes supported by said plates, means for interconnecting said electrodes to one another adjacent the edges of said supporting plates thereby to effect a plurality of electrode sets respectively encircling said workpieces, means for energizing selected ones of said electrode sets, means for grounding other ones of said electrode sets, said electrodes being operative to produce a high frequency field closely confined to the inner walls of said hopper adapted to preferentially heat the edges of said stacked workpieces, and means for cutting the preferentially heated edges of said workpieces thereby to alter the dimensions of said workpieces subsequent to the edge heating thereof.

20. In combination, an open-topped hopper adapted to receive a stack of flat dielectric workpieces therein, the walls of said hopper including a plurality of electrodes each continuously encircling said workpieces adjacent the edges of said workpieces, each of said electrodes having a cross-section of elongated rectangular configuration with the longer flat edge of said elongated rectangular cross-sectional configuration being disposed facing the edges of said stacked workpieces, and means for energizing said electrodes to produce a high frequency field, closely confined to the inner walls of said hopper, between said energized electrodes on all sides of said hopper thereby to preferentially heat said workpieces adjacent all the peripheral edges of said workpieces.

21. A hopper for heating dielectric workpieces comprising a plurality of wall structures interconnected to one another to define a central open receptacle for the reception of said workpieces, each of said wall structures comprising a substantially rectangular dielectric supporting structure, a plurality of substantially flat electrodes supported in spaced relation to one another by each of said dielectric supporting structures, means electrically interconnecting the individual electrodes in different ones of said wall structures adjacent the adjoining edges of said wall structures to effect a plurality of electrode sets spaced from one another and surrounding said receptacle, and means for energizing said electrode sets to produce a high frequency heating field closely confined to the outer boundaries of said open receptacle and adapted to preferentially heat the peripheral edges only of dielectric workpieces disposed in said receptacle.

22. The method of accurately trimming thermoplastic dielectric workpieces which comprises the steps of stacking said workpieces, producing a high frequency field fixed in position and coupling said stacked workpieces adjacent the peripheral edges thereof only and adapted to preferentially heat said peripheral edges of said workpieces to a temperature in the order of 40° F. to 60° F. above room temperature thereby to maintain dimensional stability of said workpieces, and thereafter rapidly cutting said preferentially heated edges prior to any appreciable cooling of said edges.

23. The method of accurately trimming linoleum composition tiles which comprises the steps of stacking said tiles, producing a high frequency field fixed in position and coupling said stacked tiles adjacent the peripheral edges thereof only, moving said stacked tiles through said fixed field in such position that said fixed position field continues to couple the edges only of said stacked tiles during said movement of said stacked tiles thereby to preferentially heat said tile edges in said stack to a temperature above room temperature but below the fusion temperature of the linoleum composition comprising said tiles, and thereafter trimming said preferentially heated tile edges with a cutting tool having a temperature substantially equal to room temperature.

References Cited in the file of this patent

UNITED STATES PATENTS

| | | |
|---|---|---|
| 2,328,063 | Dodge | Aug. 31, 1943 |
| 2,438,156 | Dodge | Mar. 23, 1948 |
| 2,440,316 | Unterweiser | Apr. 27, 1948 |
| 2,630,519 | Gard | Mar. 3, 1953 |
| 2,631,646 | Gannon et al. | Mar. 17, 1953 |
| 2,671,160 | Segsworth | Mar. 2, 1954 |
| 2,686,556 | Gerber et al. | Aug. 17, 1954 |
| 2,822,454 | Rothstein et al. | Feb. 4, 1958 |

OTHER REFERENCES

Herbert: German application Ser. No. k21451 V1/180 printed July 12, 1956, K1 18c 215, 2 pages spec. 1 sheet draw.